Aug. 19, 1958  W. L. LANDERS  2,848,181
WING TIP JETS
Filed Aug. 1, 1955  3 Sheets-Sheet 1
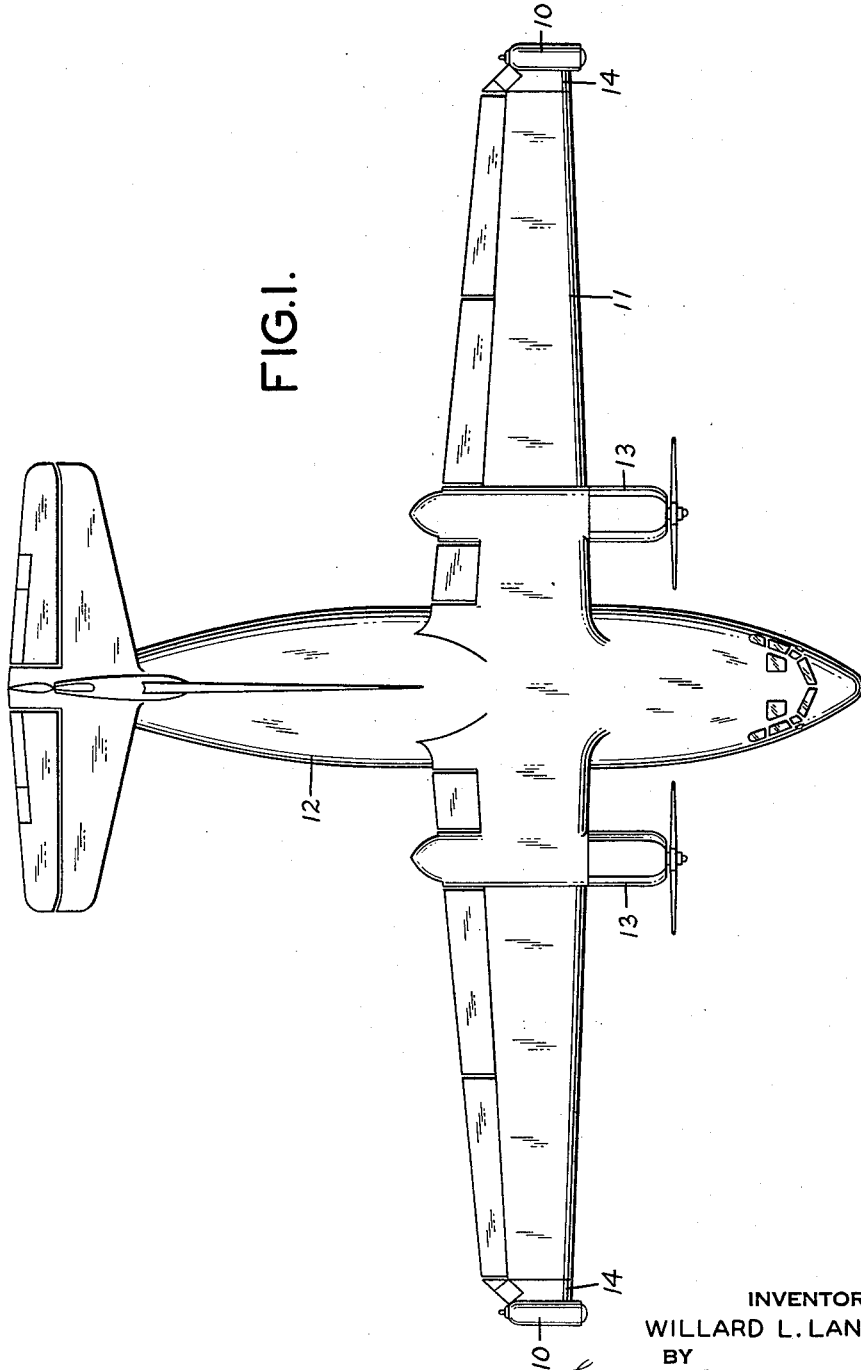
INVENTOR
WILLARD L. LANDERS
BY
HIS ATTORNEYS Aug. 19, 1958
W. L. LANDERS
2,848,181
WING TIP JETS
Filed Aug. 1, 1955
3 Sheets-Sheet 2
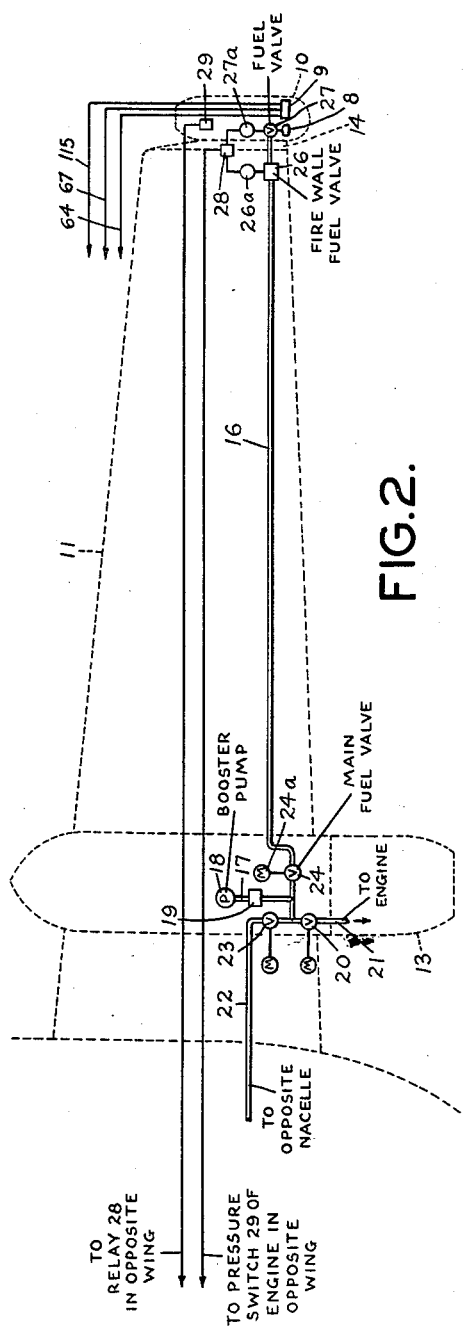
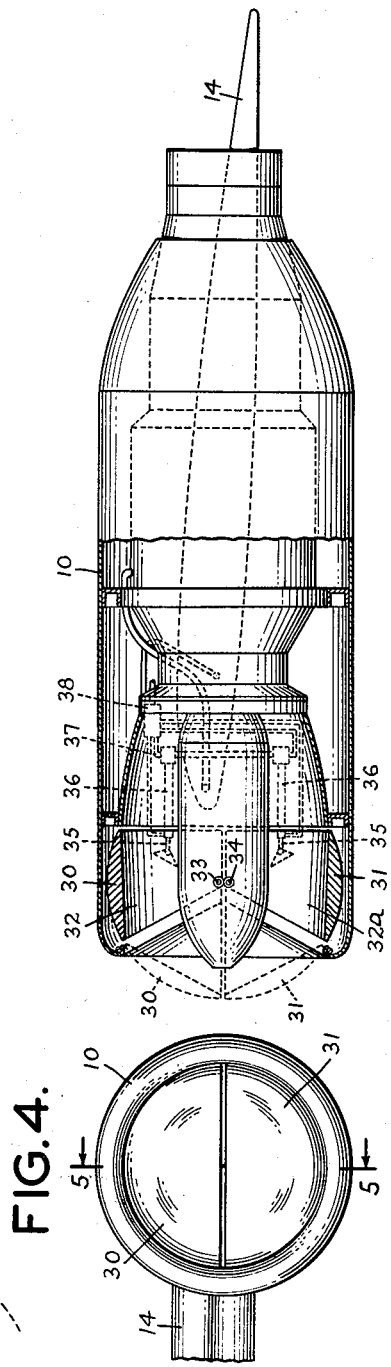
INVENTOR
WILLARD L. LANDERS
BY
Campbell, Brumbaugh, Free & Graves
HIS ATTORNEYS

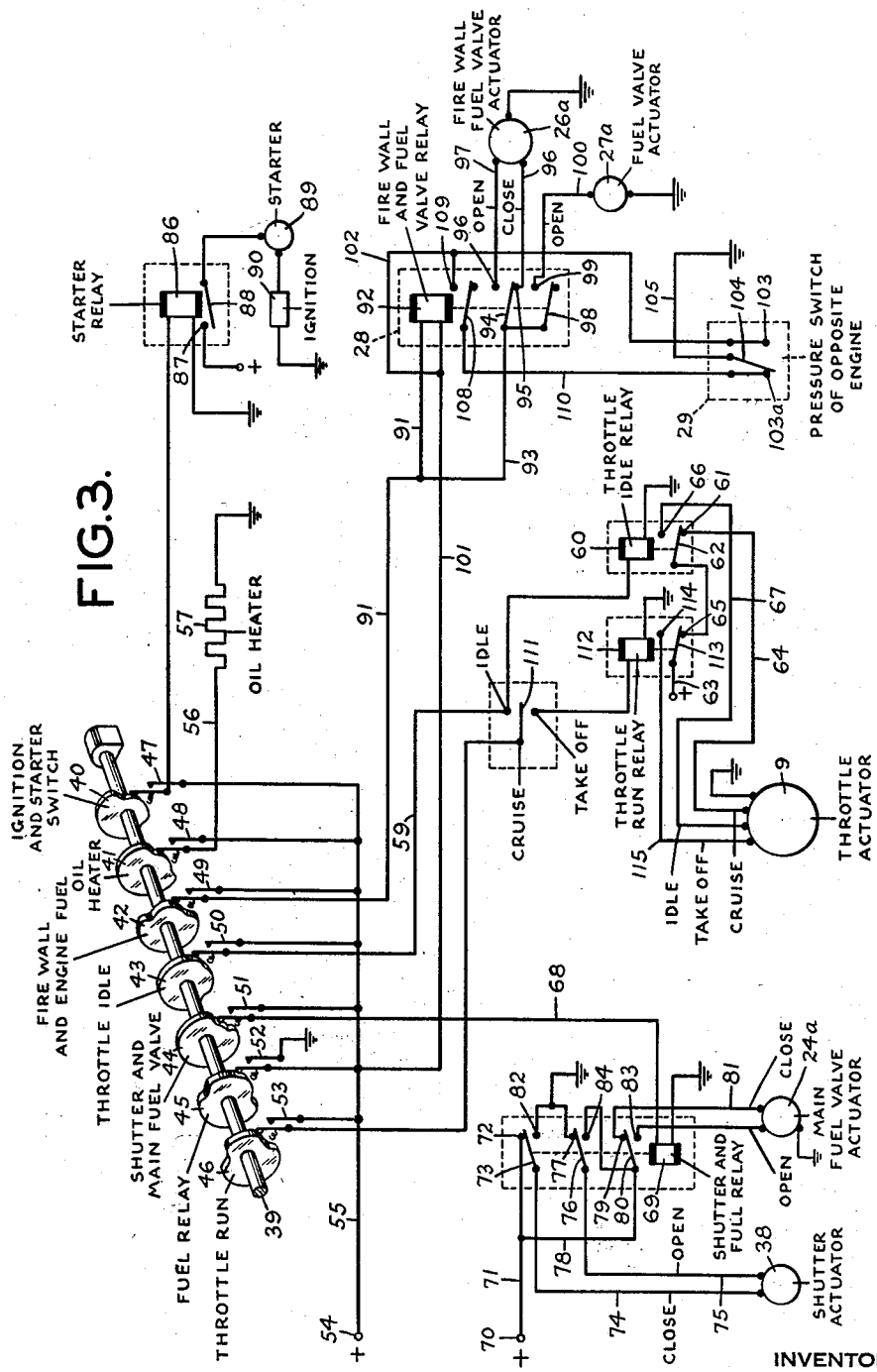

United States Patent Office 2,848,181
Patented Aug. 19, 1958

2,848,181

WING TIP JETS

Willard L. Landers, Smithsburg, Md., assignor to Fairchild Engine and Airplane Corporation, Hagerstown, Md., a corporation of Maryland Application August 1, 1955, Serial No. 525,761

7 Claims. (Cl. 244—58)

This invention relates to auxiliary power for airplanes to provide additional thrust to supplement the thrust developed by the main engines, and, more particularly, the invention relates to an airplane equipped with auxiliary jet engines installed on each wing tip.

The installation of the auxiliary wing tip jet engines according to the present invention makes possible improved performance of the airplane during take-off, climbing and flight. Greater loads may be carried, and increased speeds and faster rate of climb are possible. The installation also affords greater safety, especially in taking off from short runways or small fields and in sustaining the flight and the maintenance of altitude in the event of failure of one of the main engines.

The auxiliary jet engine may be mounted to a wing section, which wing section replaces the conventional tip section of the wing, and the wing section is detachable so that the auxiliary jet engine may be removed and the standard wing tip section reinstalled in a very short time.

Although the auxiliary wing tip jet engines require additional installation which adds to the total weight of the airplane by perhaps as much as 1400 pounds, the gross weight of the aircraft can be increased as a result of the auxiliary power afforded thereby more than ten times the added weight. Furthermore, the fuel supplied to the auxiliary jet engines is the same fuel that is supplied to the main engines, and consequently, it is not necessary to make provision for carrying two different types of fuel.

The wing tip location is chosen for the auxiliary jet engine primarily for the reason that in this location it imposes minimum drag on the airplane in flight. The drag is an important factor. The auxiliary jet engines are not intended for constant operation. Were this the case, the main engines could be made more powerful to supply the additional thrust, or two additional main engines could be employed. The main object of the auxiliary jet engines of the present invention, however, is to supply auxiliary thrust during take-off or in the event of some emergency, such as failure of one of the main engines during flight. To accomplish these ends, the maximum thrust of the auxiliary jet engines need be but a fraction of the thrust produced by the main engines. Therefore, it is not expected that the auxiliary jet engines would be used in normal flight, and accordingly it is desirable that their location be such as to impose minimum drag during normal routine flight.

As a feature of the present invention, "eyelid" type shutters are provided at the intake ends of the pods of the auxiliary jet engines, and these shutters are adapted to be closed during flight when they are not in use.

The wing tip location for the auxiliary jet engines has the further advantage that the pods produce an end plate effect on the wing which results in virtually no added drag resulting from the installation. This end plate effect on the wing has been heretofore achieved only by structure which adds to the weight of the wing without contributing to the propulsion. The engine pods also add to the effective surface area of the wings, thereby increasing the effective aspect ratio and reducing induced drag.

Other features of the present invention include the electrical control system and the multi-position switch which controls the starting cycle of the auxiliary jet engines. The electrical control system includes an emergency safety circuit which interlocks the fuel systems of the two auxiliary jet engines so that a failure of the engine on one wing tip will automatically shut off the fuel supply to the auxiliary jet engine on the other wing tip. This safety feature prevents asymmetrical thrust that could endanger the controllability of the airplane.

These and other features of the present invention will be apparent from the detailed description which follows and by reference to the accompanying drawings in which:

Fig. 1 is a plan view of an airplane equipped with the auxiliary wing tip jet engines of the present invention;

Fig. 2 is a diagram of the fuel system for one of said engines;

Fig. 3 is a circuit diagram of the electrical control system;

Fig. 4 is a front view of the jet engine showing the "eyelid" shutter doors closed; and Fig. 5 is a side elevation of one of the auxiliary jet engines with a portion thereof shown in cross section; the portion shown in cross section is taken substantially along the line 5—5 of Fig. 4, looking in the direction of the arrows.

Referring to Fig. 1, the auxiliary jet engines 10, preferably Fairchild J–44, Model FT–101E, turbo jet engines, are installed at the extreme tips of the wings 11 of an airplane 12. The main propulsion for the airplane is supplied by two main propeller driving engines 13 carried in the wings 11. The jet engines 10 are carried by wing sections 14 which are mounted in lieu of the conventional wing tip sections of the airplane, and the wing sections 14 are mounted to the wings 11 by bolts so that the sections 14 can be readily removed and the conventional wing tip sections substituted in their place.

The fuel system for the auxiliary jet engine is shown schematically in Fig. 2. The fuel is supplied to the main engine 13 through a line 17 by a booster pump 18, then via a master valve 19 and a motor-actuated valve 20 to the line 21, the line 21 supplying the fuel to the main engine. A motor-actuated valve 23 controls the flow of fuel via a line 22 from the main engine of one wing to the main engine of the other.

The auxiliary jet engines use the same fuel as the main engines. A fuel line 16 connects with the main line 17 and extends the entire length of the wing to supply fuel to the auxiliary jet engine 10 mounted at the wing tip. A main fuel valve 24 controls the flow of fluid through the line 16, and the valve 24 is controlled by an actuator 24a. A fire wall fuel valve controlled by an actuator 26a is provided in the line 16 at the extreme end of the wing 11 just inside a fire wall at the end of the wing, and an engine fuel valve 27 controlled by an actuator 27a is provided on the other side of the fire wall. The fuel valves 26, 27 are adapted to be closed under emergency conditions by a relay 28 which relay is controlled by an electrical switch 29 actuated in the event of failure of the auxiliary jet engine mounted on the opposite wing. The fuel is supplied to each auxiliary engine from the valve 27 by a throttle valve 8 which is adjusted by an electrically controlled multi-position actuator 9.

The electrical circuits controlled by the switches 29 interlock the auxiliary jet engines 10 on opposite wings, so that in the event of failure of one wing tip engine the other will automatically have its fuel supply cut off.

This safety feature prevents asymmetrical thrust on the airplane that could endanger its controllability. The electrical switches 29 preferably are pressure-sensitive switches connected by an air pressure line to the compressor of the auxiliary jet engine 10 with which it is associated. A drop in the compressor pressure of either engine, therefore, will actuate the switch 29 associated with that engine and the switch will be operative to close the valves 26, 27 to cut off fuel to the engine in the opposite wing.

As best shown in Figs. 4 and 5, the intake end of each of the auxiliary jet engines 10 is provided with an upper "eyelid" type shutter 30 and a lower "eyelid" type shutter 31. The shutters 30, 31 are shown in closed position in Fig. 4 and in open position in Fig. 5. When the auxiliary engines 10 are not in use, the shutters 30, 31 are closed, presenting a curved surface to the slip stream, causing the slip stream to flow around the outer surface of the engine pod so that the engine will impose minimum drag on the airplane. When, however, the engine is in operation, the eyelid shutters 30, 31 are opened to admit air into the intake end of the engine, and accordingly means are provided to effect the opening and closing of the shutters.

The upper shutter 30 is connected to an arm 32 pivoted at 33, and the lower shutter 31 is connected to an arm 32a pivoted at 34. Movable pistons 35 of hydraulic cylinders 36 are connected to the arms 32, 32a, and when fluid is admitted into the cylinders 36, the consequent movement of the piston rods 35 operate to close the shutters to the positions shown in dotted lines in Fig. 5. Fluid is admitted to the cylinders 36 via a line 37, and the flow of the fluid through the line 37 is controlled by an actuator 38 in that line. The actuator 38 also controls the flow of fluid through the cylinder 36 in the opposite direction to effect the opening of the eyelid shutters 30 and 31.

The electrical control system for one of the auxiliary wing tip jet engines is shown in Fig. 3. The operation of each auxiliary wing tip jet engine is controlled by a seven-position rotary switch which comprises a manually rotatable shaft 39 which accommodates seven cams 40 to 46, inclusive, each controlling one of the switches 47 to 53, inclusive. When the shaft 39 is set at position #1 or "off" position, all of the switches 47 to 53 are open and all circuits are deenergized.

When the shaft 39 is turned to position #2, circuits are completed to turn on the oil heater 57, to open the air intake shutters 30, 31, to open the main fuel valve 24 and to energize the throttle circuit. Thus, in position #2, the switch 48 is closed to complete a circuit from a power supply 54 via the conductor 55, the closed switch 48, and the conductor 56 to the oil heater 57 and thence to ground.

Also, in the #2 position, the switch 50 is closed by the cam 43 completing a circuit via the line 55, the closed switch 50, the conductor 59 to energize the relay 60. The energization of the relay 60 opens contacts 61 and 62, thereby breaking a circuit from the power supply 63 and the closed contacts 113, 65 via the conductor 64 which circuit ordinarily would control the throttle actuator 9 for cruising operation, and closes the contacts 62 and 66 to complete a circuit from the power supply 63 via the conductor 67 to condition the throttle actuator for "idling" operation.

The switch 51 is also closed in the #2 position of the switch, completing a circuit via the conductor 68 to energize the relay 69. With the relay 69 deenergized, circuits are completed from the power supply 70 via the conductor 71, the closed contacts 72, 73 and the conductor 74 to the shutter actuator 38 to effect the closing operation thereof, and then via the conductor 75 and the closed contacts 76, 77 to ground. Also, with the relay 69 deenergized, a circuit is completed via the conductor 78, the closed contacts 79, 80 and the conductor 81 to effect the closing operation of the main fuel valve actuator 24a. When the relay 69 is energized by the switch in the #2 position, circuits are completed to open the shutters 30, 31 and to open the main fuel valve 24. The circuit for opening the shutters is completed from the power supply 70, the conductors 71, 78, the closed contacts 84, 76, and the conductor 75 to the shutter actuator 38, and thence via the line 74 and the closed contacts 73, 82 to ground. The circuit for opening the main fuel valve is completed from the power supply 70 via the conductors 71 and 78, and the closed contacts 80, 83 to the main fuel valve actuator 24a.

When the shaft 39 is turned to the #3 position, all of the circuits of position #2 are maintained and, in addition, a circuit is completed to condition the ignition and the starter. Accordingly, in the #3 position, a switch 47 is closed completing a circuit via the conductor 55 and the closed switch 47 to the starter relay 86. The energization of the relay 86 closes normally open contacts 87, 88, completing a circuit to the starter 89 and to the ignition coil 90.

In the #4 position, all of the circuits are maintained as in position #3 except that the fire wall fuel valve 26 and the engine fuel valve 27 are opened. Accordingly, in the #4 position, the switches 49 and 52 are closed by the cams 42 and 45, respectively, and a circuit is completed from the voltage source 54, the conductor 55, the closed switch 49, and the conductor 91 to the relay 92, and thence via the conductor 101 and the closed switch 52 to ground. When the relay 92 is deenergized, and the switch 49 is closed, a circuit is completed from the conductor 91 via the conductor 93, the closed contacts 94, 95 and the conductor 96 to the actuator 26a to effect the closing of the fuel valve 26. The fuel valve 27 is normally maintained closed. When however, the relay 92 is energized, the contacts 94, 96 are closed completing a circuit via the conductor 97 to actuator 26a to open the fire wall fuel valve 26 and the contacts 98, 99 are closed completing a circuit via the conductor 100 to the actuator 27a to open the fuel valve 27.

When the rotary switch is in the #5 position, the switch 47 is opened and the starter relay 86 is deenergized. Also, in the #5 position, the switch 53 is closed, conditioning a three-position toggle switch 111 for operation, which switch gives the pilot control of the throttle, as will be more fully explained below.

In the #6 position of the rotary switch, the switch 52 is opened, breaking the circuit which initially energizes the relay 92. Under normal operating conditions, however, the relay 92 continues to be energized by a holding circuit which will be described in greater detail below.

Also, in the #6 position, the switch 50 is opened, deenergizing the relay 60. This places the throttle actuator completely under the control of the three-position switch 111. With the throttle switch 111 in the up position, a circuit is completed to energize the relay 60, completing a circuit from the voltage source 63 to the throttle actuator via the conductor 67 for idling speed. If the switch is moved to the intermediate position, the relay 60 will be deenergized, completing a circuit from the voltage source 63 to the throttle actuator via the conductor 64 for cruising speed. Finally, with the switch 111 in the down position a circuit is completed to energize the relay 112. The energization of the relay 112 completes a circuit from the power supply 63 via the closed contacts 113, 114 and the conductor 115 to condition the throttle actuator for take-off operation.

Finally, in the #7 position of the rotary switch, all circuits are deenergized except the switch 51 which is closed to maintain the shutters 30, 31 open to cool the engine before turning the switch to the "off" or #1 position.

Thus, the switch 47 is maintained closed in the #3 and #4 positions; the switch 48 is maintained closed in the #2, #3, #4, #5 and #6 positions; the switch 49 is maintained closed in the #4, #5 and #6 positions; the switch 50 is maintained closed in the #2, #3, #4 and #5 positions; the switch 51 is maintained closed in positions #2 to #7, inclusive, the switch 52 is maintained closed in the #4 and #5 positions; and the switch 53 is maintained closed in the #5 and #6 positions.

Turning now to a description of the interlocking circuits which render one auxiliary engine operative in the event of failure of the other auxiliary engine, as mentioned above, in the #4 and #5 positions of the rotary switch, both the switches 49 and 52 are closed, completing a circuit for the energization of the relay 92. In the #6 position of the rotary switch, however, which is the position of normal operation of the auxiliary jet engines, the switch 52 is opened. In this position, the continued energization of the relay 92, which is necessary to maintain the fuel valves 26, 27 open, depends on a holding circuit completed via the switch 29 held closed by the compression of the auxiliary jet engine in the opposite wing. If one of the auxiliary jet engines fails, the switch 29 opens and the holding circuit for the relay 92 is broken, closing the valves 26, 27 which supply fuel to the other auxiliary jet engine.

When the compressor pressure of the other auxiliary jet engine is low during the starting operation, the contacts 103a, 104 of the pressure switch 29 are maintained closed, thus insuring a holding circuit for the relay 92 when the rotary switch is in the #6 position. The holding circuit is completed via the conductor 102, the closed contacts 108, 109, the conductor 110 and the closed contacts 103a, 104 to ground. At increasing pressures, the switch 29 is a "make before break" type so that at pressures above a predetermined level the contacts 103, 104 will close before contacts 103a, 104 open. When the contacts 103, 104 close, the holding circuit for the relay 92 is completed via the conductor 102 and the closed contacts 103, 104 to ground. In the event of failure of the other auxiliary jet engine, the resulting drop in the compressor pressure opens the contacts 103, 104. At decreasing pressures, the switch 29 is "break before make" type, and, therefore, as soon as the contacts 103, 104 open, the relay 92 will be deenergized, opening the fuel valves 26, 27 to stop the engine.

It is evident that the auxiliary wing tip jet engines of the present invention may be employed to provide additional power during take-off or in the event of failure of one of the main engines. Furthermore, the auxiliary jet engines may be brought into operation during flight to facilitate rapid climbing or for added speed where desirable. During routine flight, however, the auxiliary jet engines are inoperative with the shutter doors 30, 31 closed. Therefore, it is significant that the wing tip location of the jet engines imposes minimum drag on the airplane during flight. In addition, the wing tip mounting of the jet engines reduces the induced drag by affording an end plate effect on the wing which results in no added to total drag due to the installation of the engine pods on the wing tips of the airplane. In fact, the induced drag is reduced by virtue of the fact that the effective aspect ratio is increased.

Although not shown in the drawings, it is contemplated, as an added safety feature, to automatically shut off one jet engine in case of failure of a main engine on the opposite or unfavorable side to reduce the undesirable effect of asymmetrical power. This could be accomplished in a manner similar to that described above for controlling the jet engines by adding a pressure sensitive switch to the already existing torque pressure transmitter of each main engine to sense loss of power.

The present invention has been shown in a single preferred form and by way of example only, and obviously many variations and modifications may be made therein without departing from the spirit of the invention. The invention, therefore, is not to be limited to any specific form of embodiment except insofar as such limitations are expressly set forth in the claims.

I claim:

1. In an airplane having wings, primary propulsion means, a pair of auxiliary jet engines operable to provide supplemental thrust to the airplane, the auxiliary jet engines being mounted at opposite wing tips of the airplane, means for supplying fuel to both of said auxiliary jet engines and a safety system operable automatically in the event of failure of one of the auxiliary jet engines to render inoperative the other auxiliary jet engine to prevent the operating auxiliary jet engine from producing asymmetrical thrust, said safety system including means to detect a failure of one of the auxiliary jet engines and means actuated in response to the detection of a failure of one of the auxiliary jet engines to cut off the supply of fuel to the other auxiliary jet engine.

2. In an airplane having wings, primary propulsion means, a pair of auxiliary jet engines being mounted at opposite wing tips of the airplane, fuel lines to supply fuel to the auxiliary jet engines, valve means to control the flow of fuel through said fuel lines, actuator means for controlling the operation of each of said valve means, and means responsive to the failure of one of the auxiliary jet engines for operating the valve actuator to stop the flow of fuel to the other of said auxiliary jet engines.

3. In an airplane having wings, primary propulsion means, a pair of auxiliary engines operable to provide supplemental thrust to the airplane, fuel lines to supply fuel to the auxiliary engines, a valve in each of the fuel lines to control the flow of fuel through said fuel line, an electrically controlled actuator for said valve, and switch means to control the operation of said electrically controlled actuator, the switch means being operated by the failure of one of the auxiliary engines and the switch being operable to close the fuel valve to the other auxiliary engine to cut off the supply of fuel, thereby preventing the operating auxiliary engine from producing asymmetrical thrust.

4. In an airplane, primary propulsion means, a pair of auxiliary engines operable to provide supplemental thrust to the airplane, a fuel line to each of the auxiliary engines for supplying fuel thereto, a valve interposed in said line, an electrically controlled actuator for said valve, a multi-position control switch in a preliminary position establishing an electrical circuit to operate the fuel valve actuator to start the respective auxiliary engine and in the normal operative position breaking said electrical circuit, and safety switch means actuated by the operation of one auxiliary engine to maintain said electrical circuit to the fuel valve actuator established when the multi-position control switch is in the operative position, the actuation of said safety switch in the event of failure of the one auxiliary engine serving to operate the fuel valve actuator to stop the supply of fuel to the other auxiliary engine.

5. In an airplane, primary propulsion means, a pair of auxiliary engines operable to provide supplemental thrust, a fuel line each of said auxiliary engines, a valve interposed in said fuel line, actuator means for controlling the operation of said valve, throttles for each of said auxiliary engines, actuator means for controlling the throttle, doors at the intake end of each of said auxiliary engines, an actuator for controlling the opening and closing of said doors, a multi-position control switch, means operable in response to the setting of the multi-position control switch in a given position to operate the actuator for opening the doors, means operable in response to the setting of the multi-purpose switch at a given position to operate the throttle actuator for an idling speed, means responsive to the setting of the multi-position switch in a given position to operate the fuel valve actuator to open the fuel valve, a throttle control switch for the pilot, and means operable in response to the setting of the multi-position switch at a given position for conditioning said throttle control switch for operation.

6. The combination set forth in claim 5 including interlocking electrical circuits between the auxiliary engines operative in the event of failure of one of the auxiliary engines to control the operation of the fuel valve actuator to stop the supply of fuel to the other auxiliary engine.

7. In an airplane having wings, primary propulsion means, a pair of auxiliary jet engines operable to provide supplemental thrust to the airplane, the auxiliary engines being mounted at opposite wing tips of the airplane, engine shut-off means for each of said auxiliary jet engines operable to render the corresponding engine inoperative, and an automatic control means associated with each of said jet engines, each of said automatic control means being operable in response to the failure of the other auxiliary jet engine to render operative the engine shut-off means associated with the properly functioning auxiliary jet engine to prevent asymmetrical thrust on the airplane.

References Cited in the file of this patent

UNITED STATES PATENTS

| | | |
|---|---|---|
| 2,640,550 | Knapp | June 2, 1953 |
| 2,737,015 | Wright | Mar. 6, 1956 |

FOREIGN PATENTS

| | | |
|---|---|---|
| 930,751 | France | Aug. 25, 1947 |
| 991,303 | France | June 20, 1951 |
| 995,924 | France | Aug. 22, 1951 |